United States Patent
Grokop et al.

(10) Patent No.: US 9,407,706 B2
(45) Date of Patent: Aug. 2, 2016

(54) METHODS, DEVICES, AND APPARATUSES FOR ACTIVITY CLASSIFICATION USING TEMPORAL SCALING OF TIME-REFERENCED FEATURES

(75) Inventors: Leonard Henry Grokop, San Diego, CA (US); Anthony Sarah, San Diego, CA (US); Sanjiv Nanda, Ramona, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 815 days.

(21) Appl. No.: 13/363,147

(22) Filed: Jan. 31, 2012

(65) Prior Publication Data
US 2013/0035893 A1 Feb. 7, 2013

Related U.S. Application Data

(60) Provisional application No. 61/470,040, filed on Mar. 31, 2011.

(51) Int. Cl.
*H04L 29/08* (2006.01)
*H04M 1/725* (2006.01)

(52) U.S. Cl.
CPC .............. *H04L 67/22* (2013.01); *H04L 67/04* (2013.01); *H04L 67/125* (2013.01); *H04M 1/72569* (2013.01); *H04M 2250/12* (2013.01)

(58) Field of Classification Search
CPC ..................................................... H04L 67/22
USPC ......................................................... 702/141
See application file for complete search history.

(56) References Cited

U.S. PATENT DOCUMENTS

| 9,201,841 | B2 | 12/2015 | Rubin et al. |
|---|---|---|---|
| 2006/0135883 | A1 | 6/2006 | Jonsson et al. |
| 2007/0208501 | A1 | 9/2007 | Downs et al. |
| 2008/0162088 | A1 | 7/2008 | Devaul et al. |
| 2009/0088204 | A1 | 4/2009 | Culbert et al. |
| 2009/0132197 | A1 | 5/2009 | Rubin et al. |
| 2010/0056872 | A1 | 3/2010 | Kahn et al. |
| 2010/0191155 | A1 | 7/2010 | Kim et al. |
| 2010/0299615 | A1* | 11/2010 | Miluzzo et al. ............... 715/752 |

(Continued)

FOREIGN PATENT DOCUMENTS

| CN | 101919273 A | 12/2010 |
|---|---|---|
| JP | 2011504331 A | 2/2011 |

(Continued)

OTHER PUBLICATIONS

International Search Report and Written Opinion—PCT/US2012/028804—ISA/EPO—Jul. 4, 2012.

(Continued)

*Primary Examiner* — Manuel Rivera Vargas
(74) *Attorney, Agent, or Firm* — Kilpatrick Townsend & Stockton LLP

(57) ABSTRACT

Components, methods, and apparatuses are provided that may be used to obtain a plurality of time-referenced features extracted from signals received from one or more inertial sensors of a mobile device, wherein the time-referenced features are provided according to heterogeneous time scales. The time-referenced features are combined over a decision window to infer an activity of a user co-located with the mobile device.

30 Claims, 4 Drawing Sheets

(56) References Cited

U.S. PATENT DOCUMENTS

2011/0190008 A1* 8/2011 Eronen .............. G01C 21/3484
455/456.3
2013/0226850 A1* 8/2013 Hannuksela et al. ........... 706/14

FOREIGN PATENT DOCUMENTS

| WO | WO-2009062176 | A2 | 5/2009 |
| WO | WO2009156978 | A1 | 12/2009 |

OTHER PUBLICATIONS

Shirai H., et al., "A Study on the Walking States Classification Method using LPC cepstrum of Acceleration Data", Technical Report of IEICE, Japan, The Institute of Electronics, Information and Communication Engineers, Feb. 24, 2011, vol. 110, No. 450, pp. 119-120.

Tada M., et al., "A Method for Measuring and Analyzing Driving Behavior Using Wireless Accelerometers", Technical Report of IEICE, Japan, The Institute of Electronics, Information and Communication Engineers, Apr. 1, 2008, vol. J91-D, No. 4, pp. 1115-1129.

* cited by examiner

METHODS, DEVICES, AND APPARATUSES FOR ACTIVITY CLASSIFICATION USING TEMPORAL SCALING OF TIME-REFERENCED FEATURES

CROSS REFERENCE TO RELATED APPLICATIONS

The present application claims priority to U.S. provisional application No. 61/470,040 titled "Classification Using Temporal Scaling of Feature Intervals," filed Mar. 31, 2011, which is hereby incorporated by reference in its entirety.

BACKGROUND

1. Field

The subject matter disclosed herein relates to classifying user activity in a mobile device.

2. Information

Many mobile communication devices, such as smartphones, include an inertial sensor, such as an accelerometer, that may be used to detect motion of the device. These movements may be useful in detecting the device's orientation so that a display may be properly oriented, for example in a portrait or a landscape mode, when displaying information to a user. In another example, a gaming application performed using a smartphone may rely on movements detected by one or more accelerometers so that a feature of the game may be controlled. In other examples, a gesturing movement detected by an accelerometer may allow a user to scroll a map, navigate a menu, or control other aspects of the device's operation.

Though useful in assisting with simple user interface tasks, output "traces" of an accelerometer have been limited from providing more sophisticated and meaningful assistance to mobile device users. For example, if a mobile device can detect that a user is engaged in a vigorous activity, it may be useful to direct incoming telephone calls immediately to voicemail so as not to distract the user. In another example, if it can be detected that a mobile device is in a user's purse or pocket, it may be advantageous to disable a display so as not to waste battery resources.

SUMMARY

In a particular implementation, a method comprises obtaining a plurality of time-referenced features extracted from signals received from one or more inertial sensors of a mobile device, the time-referenced features being provided according to heterogeneous time scales. The method also includes combining the time-referenced features over a decision window to infer an activity of a user co-located with the mobile device.

In another implementation, an apparatus comprises means for obtaining a plurality of time-referenced features extracted from signals received from one or more inertial sensors of a mobile device, wherein the time-referenced features are provided according to heterogeneous time scales. The apparatus further comprises means for combining the time-referenced features over a decision window to infer an activity of a user co-located with the mobile device.

In another implementation, an article comprises a non-transitory storage medium comprising machine-readable instructions stored thereon which are executable by a processor of a mobile device to obtain a plurality of time-referenced features extracted from signals received from one or more inertial sensors of a mobile device wherein the time-referenced features are provided according to heterogeneous sample periods. The instructions also instruct the processor to combine the time-referenced features over a decision window to infer an activity of a user co-located with the mobile device.

In another implementation, a mobile device comprises one or more inertial sensors and one or more processors to obtain a plurality of time-referenced features extracted from signals received from the one or more inertial sensors. The time-referenced features are provided according to heterogeneous time scales. The processor combines the time-referenced features over a decision window to infer an activity of a user co-located with the mobile device

BRIEF DESCRIPTION OF DRAWINGS

Non-limiting and non-exhaustive aspects are described with reference to the following figures, wherein like reference numerals refer to like parts throughout the various figures.

DETAILED DESCRIPTION

Devices, methods, and apparatuses are provided that may be implemented in various mobile devices to classify an activity of a user of the mobile device. In implementations, signal-processing algorithms, which may include Cepstral filtering, may be applied to one or more output traces of an inertial sensor, such as an accelerometer, included within the mobile device.

In a particular implementation, a classifier may infer an activity state of a mobile device user based, at least in part, on signals received from inertial sensors on the mobile device. In particular examples, signals from one or more inertial sensors may be processed over a particular time scale to compute or extract time-referenced "features" that may be indicative or suggestive of a particular activity class. Indications of likelihood may be described in terms of a "likelihood function," such as a log-likelihood or other expression derived from or pertaining to likelihood of a particular activity class, may be computed over a first time scale and combined with similar likelihood functions computed over at least one other time scale during a decision window. A Bayesian classifier and/or pattern recognition may be applied to infer a particular activity from features computed over multiple time scales.

In a particular implementation, a feature may be computed from signals received from inertial sensors and computed at particular time scales over which the received signals are processed and analyzed. It should be understood that different computed features may be processed over different (e.g. heterogeneous) time scales. Further, for any particular computed feature, varying a time scale may vary the usefulness of the feature used in characterizing a motion state of a user co-located with a mobile device. For example, if a motion state of the user remains constant (e.g., user is walking), an average magnitude of an acceleration feature may become an increasingly accurate indication of this activity class as the time scale over which the average is taken is increased in duration. In contrast, an opposite effect may prevail for an average-orientation feature, in which movements in one or more of pitch and roll dimensions are computed. In an average-orientation computation, as the time scale for this feature is increased, the computation may no longer capture the range of orientations in the motion.

In a particular implementation, time-referenced features may be combined for use in inferring an activity of a user co-located with a mobile device. Combined features, however, may be determined over heterogeneous time scales. In this context, a user may be co-located with a mobile device by, for example, holding the mobile device, wearing the mobile device, having the mobile device in his/her pocket, just to name a few examples.

Figure 1:
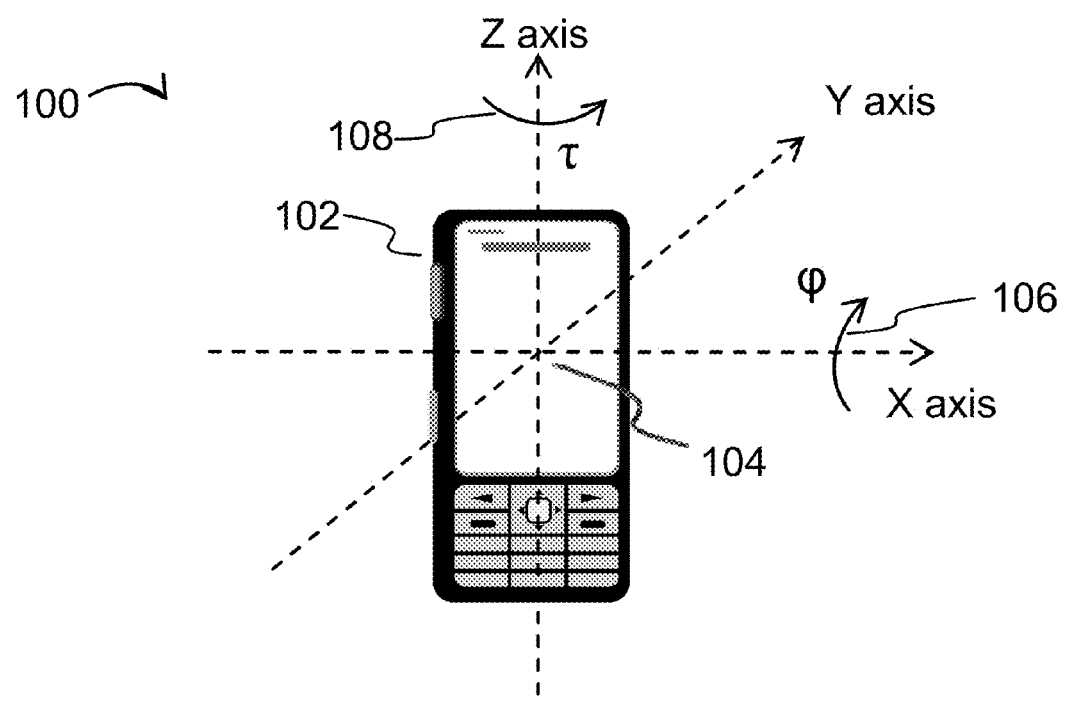
FIG. 1 is an example coordinate system that may be applied to a mobile device according to an implementation.

FIG. 1 illustrates example coordinate system 100 that may be applied to a mobile device according to an implementation. In FIG. 1, coordinate system 100 may be used, in whole or in part, to facilitate or support activity classification using temporal scaling of time-referenced features of a mobile device, such as a mobile device 102, for example, using accelerometer output signals. It should be understood, however that an accelerometer is but one example of an inertial sensor from which a user activity may be classified and claimed subject matter is not limited in this respect. Examples of inertial sensors may include gyroscopes, magnetometers, piezoelectric devices and so forth. In other implementations, other types of sensors, such as pressure sensors, ambient light sensors, imaging sensors, temperature sensors, just to name a few examples, may produce output signals that may be processed to infer an activity state of a user co-located with a mobile device.

As illustrated, coordinate system 100 may comprise, for example, a 3-dimensional Cartesian coordinate system, though claimed subject matter is not so limited. In this illustrated example, motion of mobile device 102 represents, for example, acceleration vibration that may be detected or measured, at least in part, with reference to 3 linear dimensions or axes X, Y, and Z relative to origin 104 of example coordinate system 100. It should be appreciated that example coordinate system 100 may or may not be aligned with the body of mobile device 102. It should also be noted that in certain implementations, a non-Cartesian coordinate system, such as a cylindrical or spherical coordinate system, may be used or any other coordinate system that may define mutually-orthogonal dimensions.

As also illustrated in FIG. 1, rotational motion of mobile device 102, as the orientation of the device changes about gravity, for example, may be detected or measured, at least in part, with reference to one or two dimensions. In an implementation, rotational motion of mobile device 102 may be detected or measured in terms coordinates ($\phi$, $\tau$), where phi ($\phi$) represents pitch or rotation about an X-axis, as illustrated generally by an arrow at 106, and tau ($\tau$) represents roll or rotation about a Z-axis, as illustrated generally by an arrow 108. Accordingly, in an implementation, a 3-dimensional accelerometer may detect or measure, at least in part, a level of acceleration vibration as well as a change about gravity with respect to roll or pitch dimensions, for example, thus, providing 5 dimensions of observability (X, Y, Z, $\phi$, $\tau$). However, these are merely examples of various motions that may be detected or measured with reference to example coordinate system 100, and claimed subject matter is not limited to above-described motions or coordinate systems.

Figure 2:
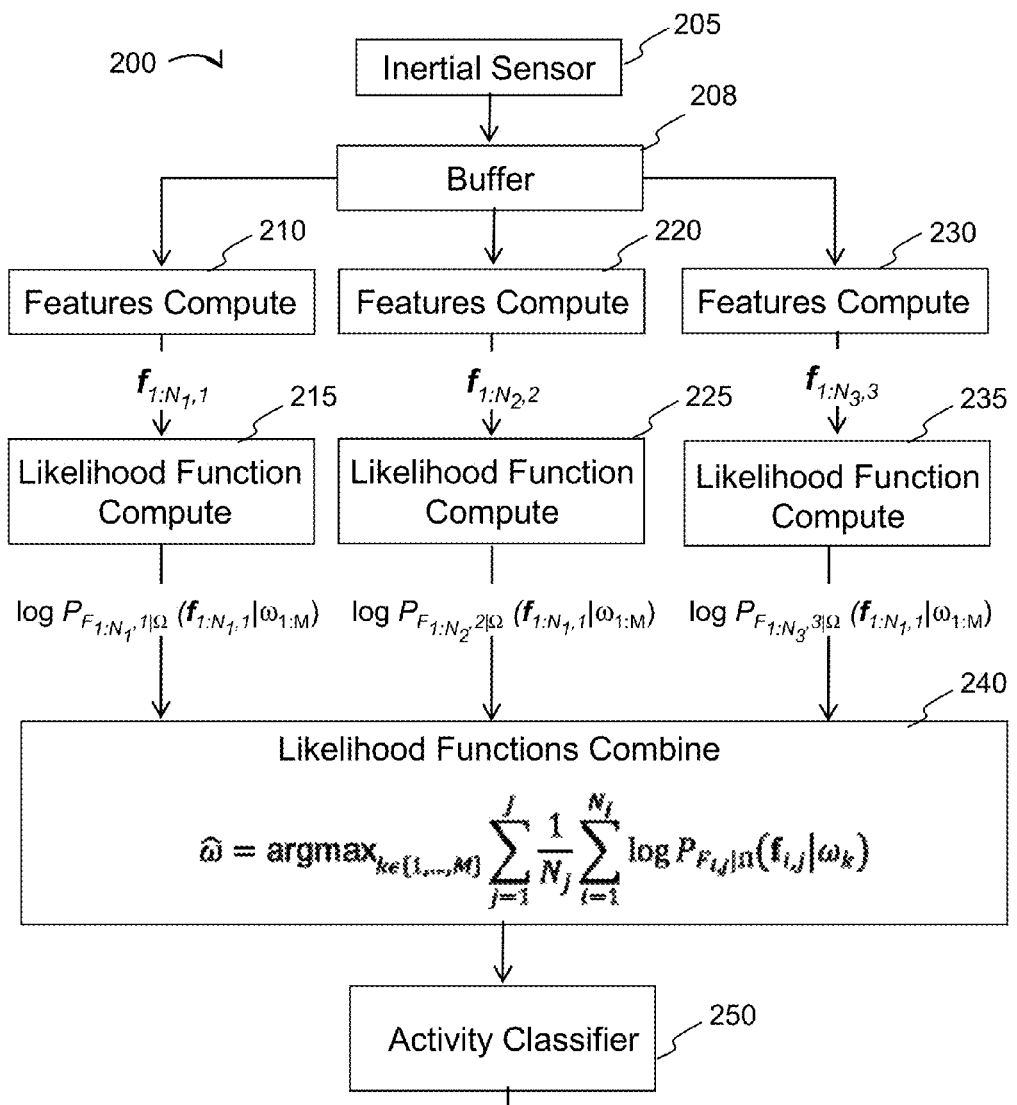
FIG. 2 is a diagram of an apparatus for activity classification using temporal scaling of time-referenced features according to an implementation.

Following the above discussion, a 3-dimensional accelerometer may detect or measure accelerations in 3-dimensional space due to various vibrations, for example, in response to activity of a user co-located with the device. Typically, although not necessarily, acceleration vibrations may be associated, for example, with a moving vehicle (e.g., engine, wheels, etc. vibrations, unevenness in a road, etc.), user's walking or running, hand or wrist tremor, aerobic exercise, or other phenomena that may ordinarily exist in mobile settings or environments FIG. 2 is a diagram (200) of an apparatus for activity classification using temporal scaling of time-referenced features according to an implementation. In FIG. 2, inertial sensor 205, located on a mobile device, generates an output "trace" comprising an electrical or other type of signal to buffer 208. In an implementation, inertial sensor 205 may be an accelerometer that generates one or more traces representing acceleration of the mobile device in various dimensions (e.g. X, Y, Z, $\phi$, $\tau$) of observability.

Coupled to output terminals of buffer 208 are features compute modules 210, 220, and 230. In an implementation, features compute modules apply signal processing algorithms which may include Cepstral filtering to arrive at parallel streams representing vectors of information states $f_1:n_1 1$, $f_1:n_2 2$, and $f_1:n_3 3$, in which features are allocated to at least one of several time scales. In an implementation, features compute modules 210, 220, and 230 comprise heterogeneous time scales. For example, features compute module 210 may comprise a time scale that is three times the time scale of features compute module 220, and five times the time scale of features compute module 230.

In the implementation of FIG. 2, three features compute modules are shown. In other implementations, a lesser number of features compute modules may be used, such as two, or a larger number of features compute modules may be used, such as three, four, five, or an even greater number. As mentioned previously, in particular implementations, one or more features may be extracted from signals from inertial sensor 205 using information states stored in buffer 208. These features include:

1. Cepstral Coefficients (CCs);
2. Mel-Frequency Cepstral Coefficients (MFCCs);
3. delta Cepstral Coefficients (dCCs);
4. delta Mel-Frequency Cepstral Coefficients (dMFCCs);
5. accel Cepstral Coefficients (d2CCs);
6. accel Mel-Frequency Cepstral Coefficients (d2MFCCs);
7. Linear Prediction Coefficients (LPCs);
8. delta Linear Prediction coefficients (dLPCs);
9. accel Linear Prediction coefficients (dLPCs);
10. Variance from accelerometer norm; and
11. Accelerometer pitch and roll or other angles associated with accelerometer orientation with respect to gravity.

It should be understood, however, that these are merely examples of features that may be extracted from a signal to characterize a spectral envelope (e.g., for use in inferring an activity class of a user co-located with a mobile device) and claimed subject matter is not limited in this respect.

Regarding extraction of features to characterize a spectral envelope of an inertial sensor signal, CCs or MFCCs may provide a parameterization of a spectral envelope of a waveform, and thus may be useful in distinguishing waveforms arising from different types of motions, such as a user's walk or gait, with a mobile device positioned at different locations on the user. In an implementation, CCs may be used to extract features characterized from an inertial sensor signal in which equal emphasis (e.g. weight) is applied to frequency bands of interest. In other implementations, such as may be used in MFCC feature extraction, lower frequency signals may be emphasized while higher frequency signals are deemphasized.

In an example, a mobile device positioned in a user's hip pocket while the user is walking may result in an accelerometer trace (accelerator output as a function of time) that is different than an accelerometer trace resulting from the user carrying the mobile device in his or her hand. In this example, a mobile device positioned in the user's pocket may undergo distinct and periodic acceleration in the vertical (±Z) direction as the user walks but may undergo very little acceleration in the ±X or ±Y directions. In contrast, a mobile device positioned in a user's hand while the user walks, may undergo less pronounced periodic acceleration in the vertical (±Z) direction but may undergo increased acceleration in the ±X or ±Y directions, for example. Note that the word "trace" does not imply that the parameter is displayed or that continuous values of the parameter need be used; instead it refers to values of the parameter as a function of time.

In an implementation, delta CCs may be used to enhance the performance of CCs by considering velocity (e.g., rate of change with respect to time) of each CC across overlapping windows in addition to static CCs. Accel CCs may further enhance the performance of CCs by additionally considering an acceleration of one or more static CCs across overlapping windows (e.g., rate of change of velocity with respect to time).

In implementations, parameters for delta MFCCs and accel MFCCs may be similarly applied. For example, to apply delta and accel filtering, static MFCCs may be computed using pre-emphasis filtering of frequency bands of interest from the inertial sensor signal. Delta and accel filtering may then be performed on computed MFCCs to determine velocity and acceleration (as a function of time) of one or more MFCCs.

In implementations, linear prediction coefficients (LPCs) may be used to characterize a spectral envelope if an underlying inertial sensor signal is generated by an all-pole autoregressive process. In an implementation, an LPC may model an inertial sensor's output signal at a particular point in time as an approximate linear combination of previous output samples. In an example, an error signal may be added to a set of coefficients that describe the output signal during one or more data windows.

In an implementation, a one-to-one mapping may exist from LPCs to MFCCs. Delta LPCs may enhance the performance of LPCs by additionally considering a velocity (e.g., rate of change as a function of time) of each coefficient across overlapping windows. Accel LPCs may further enhance the performance of LPCs by additionally considering an acceleration of each coefficient across overlapping windows (e.g., rate of change of velocity as a function of time).

In an alternative implementation, other features may be extracted from an inertial sensor signal for use in characterizing an activity of a user collocated with a mobile device (e.g., in lieu of or in combination with a characterization of a spectral envelope). These may include:
1. Pitch
2. Spectral Entropy;
3. Zero Crossing Rate (ZCR);
4. Spectral Centroid (SC);
5. Bandwidth (BW);
6. Band Energies (BEs);
7. Spectral Flux (SF); and
8. Spectral Roll-off (SR).

In an implementation, pitch, which may define the fundamental frequency of a periodic motion, may be measured from an inertial sensor signal. A measurement of pitch may be useful, for example, in differentiating between or among activities having similar motions that occur at different rates, such as, for example, jogging vs. running, strolling vs. a brisk walk, and so forth.

In an implementation, spectral entropy, which may correspond to a short-duration frequency spectrum of an inertial sensor signal if normalized and viewed as a probability distribution, may be measured. For example, a measurement of spectral entropy may enable parameterization of a degree of periodicity of a signal. In an example, lower spectral entropy, computed from an accelerometer trace, may indicate that the user is engaged in a periodic activity such as walking, running, cycling, and so forth. Higher spectral entropy, on the other hand, may be an indicator that the user is engaged in an aperiodic activity such as manipulating the device or driving an automobile on an uneven road.

In an implementation, a zero crossing rate, which may describe the number of times per second an inertial sensor signal crosses its mean value in a certain time window, may be measured. Measurement of a zero crossing rate may be useful in differentiating between motions or device positions that produce inertial sensor signals that fluctuate at different rates, such as walking, which may be indicated by slower fluctuations between positive and negative values vs. running, which may be indicated by more rapid fluctuations between positive and negative values.

In an implementation, a spectral centroid, which may represent a mean frequency of a short-duration frequency spectrum of an inertial sensor signal, may be measured. Subband spectral centroids may found by applying a filterbank to the power spectrum of the inertial sensor signal, and then computing the first moment (or centroid) for each subband. The signal frequency range may then be partitioned into a number of bins. A corresponding bin for each subband may be determined and incremented by one. Cepstral coefficients may then be determined by computing the discrete cosine transform of a resulting histogram.

In an implementation, a bandwidth, which may be represented as a standard deviation of the short time frequency spectrum of an inertial sensor signal may be measured. In an example, the bandwidth of an inertial sensor signal may be used to complement one or more other measurements, such as those described herein. In an implementation, band energies, which may be descriptive of energies in different frequency bands of a short duration frequency spectrum of an inertial sensor signal, may be measured.

In various implementations, measurements of spectral centroid, bandwidth and/or band energies may be useful, for example, in differentiating between or among motions or device positions that produce inertial sensor output signals, which may indicate energy concentrations in different portions of a frequency spectrum (e.g., high frequency activities vs. low frequency activities). In some implementations, these additional measurements, made in conjunction with other measurements may be used to increase a likelihood function of a correct activity detection based on an inertial sensor signal.

In an implementation, spectral flux, which may be the average of the difference between the short time frequency spectra across two consecutive windows of an inertial sensor signal, may be measured. Measurement of spectral flux may be used, for example, in characterizing the speed at which a particular periodic behavior is changing (e.g., in characterizing an aerobic activity in which an activity level may change significantly in a short time).

In an implementation, spectral roll-off, which may be the frequency below which a certain fraction of the signal energy resides, may be measured. In an example, spectral roll-off may be useful in characterizing the shape of a frequency spectrum, which may be useful in determining user activity if combined with other measurements.

In an implementation, the vectors of information states $f_1:n_1 1$, $f_1:n_2 2$, and $f_1:n_3 3$, are conveyed to likelihood function compute modules 215, 225, and 235, respectively. Likelihood function compute modules 215, 225, and 235 compute the likelihood function for each activity class ($\omega$) across the time scales of each features compute module. For example, likelihood function compute module 215 may compute a likelihood function for various activities, such as walking, running, cycling, and so forth, using the time scale of features compute module 210. In a similar manner, likelihood function compute module 225, may compute a likelihood function for activities using the time scale of features compute module 220. Further, likelihood function compute module 235 may compute a likelihood function for activities using the time scale of features compute module 230.

Output states of likelihood function compute modules 215, 225, and 235, may be combined using likelihood functions combine module 240, which may implement a Bayesian classifier. In an implementation, an assumption may be made that features of different time scales may be treated as statistically independent. For time scales, the joint probabilities computed over heterogeneous time scales may be modeled using a Gaussian Mixture Model, in which a covariance matrix of each mixture component may be used to capture the correlation between features within the time scale. In an implementation, once the system has been trained (e.g. the parameters of the statistical model are estimated) classification may proceed by computing the likelihood functions for each activity class within each time scale. A Bayesian classifier may then be used to combine the likelihood functions for each activity class across the various time scales.

In an implementation, combining likelihood functions for each activity class across different time scales is performed by first computing, for each time scale, the average likelihood function for each activity class. In an implementation, this average is taken across all time scales within the decision window. These averages may then be summed across different time scales using a Bayesian classifier to form a combined likelihood function. The classification with the highest combined likelihood function is then generated from activity classifier 250.

$$\hat{\omega} = \mathrm{argmax}_{k \in \{1,\ldots,M\}} \sum_{j=1}^{J} \frac{1}{N_j} \sum_{i=1}^{N_j} \log P_{(F_{i,j}|\Omega)(f_{i,j}|\omega_k)}$$

In the above expression, and in FIG. 2, the number of time scales is indicated by J. The number of time windows in the Jth time scale is given by $N_j$. And the number of activity classes is given by M. The feature random variable/vector computed in the ith time window in the jth time scale is given by $F_{i,j}$, and a realization of a random variable/vector by $f_{i,j}$, the random variable denoting the underlying activity class is identified by $\Omega$, and a realization of $\Omega$ is an element of the set of underlying activities $\{\omega_1, \ldots, \omega_M\}$.

In an implementation, a more optimized combination of likelihood functions for each activity class across different time scales may involve the application of weighting factors to different time windows and different time scales. Such as:

$$\hat{\omega} = \mathrm{argmax}_{k \in \{1,\ldots,M\}} \sum_{j=1}^{J} \frac{\beta_j}{N_j} \sum_{i=1}^{N_j} \alpha_i \log P_{(F_{i,j}|\Omega)(f_{i,j}|\omega_k)}$$

In which the weighting factor $\alpha_i$ may be selected for different time windows, and in which the weighting factor $\beta_j$ may be selected for different time scales.

Figure 3:
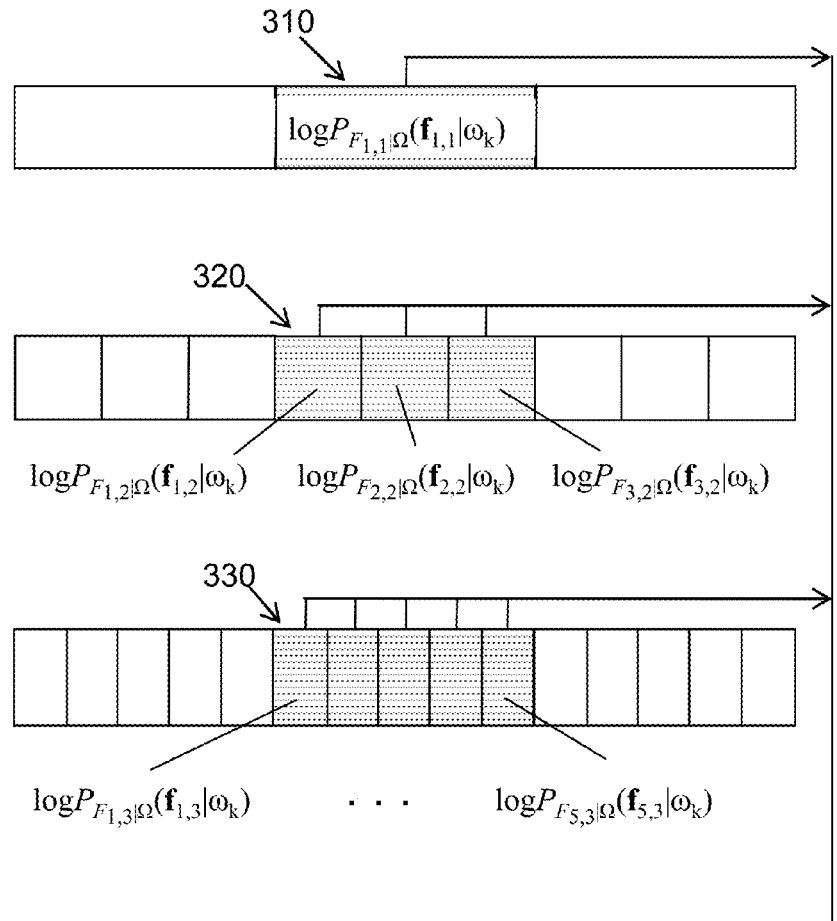
FIG. 3 is a diagram showing example time scales used in activity classification according to an implementation.

FIG. 3 is a diagram (300) showing example decision windows used in activity classification according to an implementation. In FIG. 3, five time windows 330, and three time windows 320 overlap decision window 310. In an implementation, likelihood functions are computed within each of time windows 310 and 320 and combined with the likelihood functions from decision window 310 using a Bayesian classifier.

Although FIG. 3 shows five time windows 330, and three time windows 320 overlapping decision window 310, nothing prevents use of the decision window having a duration of a different integer multiple of time windows 320 and 330. In an implementation, for example, a first time window may be two times the duration of a decision window, while a second time window may be four times the decision window. Accordingly, it should be understood that this represents only a few non-limiting possible example heterogeneous time scales, and claimed subject matter is not limited in this respect.

Figure 4:
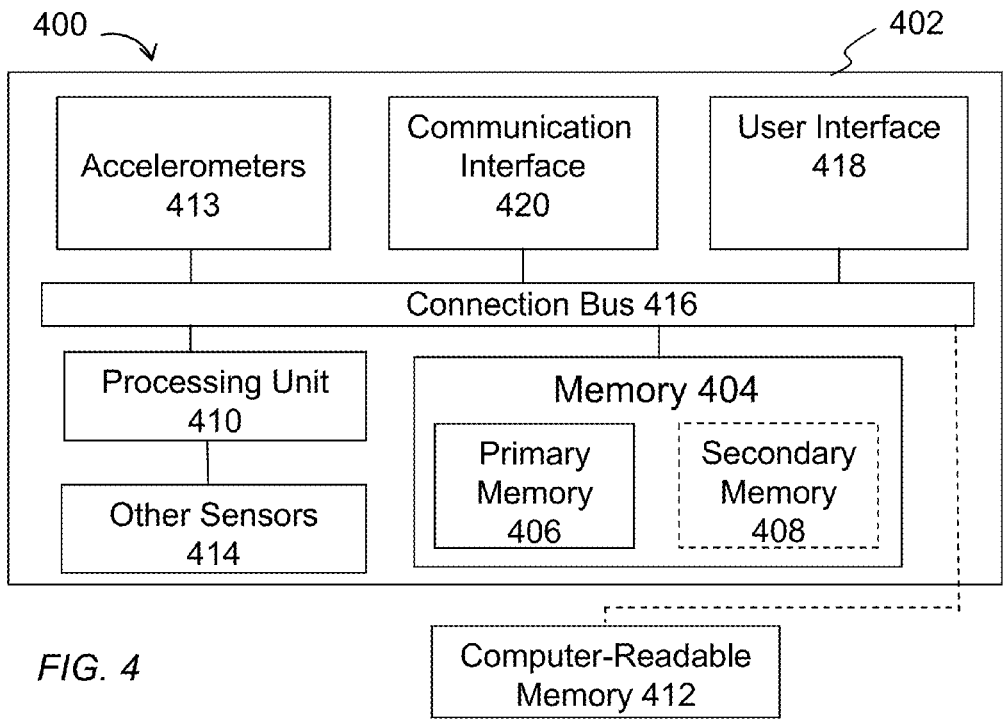
FIG. 4 is a schematic diagram illustrating an example-computing environment associated with a mobile device according to an implementation.

FIG. 4 is a schematic diagram illustrating an implementation of an example computing environment 400 that may include one or more networks or devices capable of partially or substantially implementing or supporting one or more processes for classifying an activity of a user co-located with a mobile device based, at least in part, inertial sensor signals. It should be appreciated that all or part of various devices or networks shown in computing environment 400, processes, or methods, as described herein, may be implemented using various hardware, firmware, or any combination thereof along with software.

Computing environment 400 may include, for example, a mobile device 402, which may be communicatively coupled to any number of other devices, mobile or otherwise, via a suitable communications network, such as a cellular telephone network, the Internet, mobile ad-hoc network, wireless sensor network, or the like. In an implementation, mobile device 402 may be representative of any electronic device, appliance, or machine that may be capable of exchanging information over any suitable communications network. For example, mobile device 402 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 402 may take the form of one or more integrated circuits, circuit boards, or the like that may be operatively enabled for use in another device. Although not shown, optionally or alternatively, there may be additional devices, mobile or otherwise, communicatively coupled to mobile device 402 to facilitate or otherwise support 1 or more processes associated with computing environment 400. Thus, unless stated otherwise, to simplify discussion, various functionalities, elements, components, etc. are described below with reference to mobile device 402 may also be applicable to other devices not shown so as to support one or more processes associated with example computing environment 400.

Computing environment 400 may include, for example, various computing or communication resources capable of providing position or location information with regard to a mobile device 402 based, at least in part, on one or more wireless signals associated with a positioning system, location-based service, or the like. Although not shown, in certain example implementations, mobile device 402 may include, for example, a location-aware or tracking unit capable of acquiring or providing all or part of orientation, position information (e.g., via trilateration, heat map signature matching, etc.), etc. Such information may be provided in support of one or more processes in response to user instructions, motion-controlled or otherwise, which may be stored in memory 404, for example, along with other suitable or desired information, such as one or more threshold values, or the like.

Memory 404 may represent any suitable or desired information storage medium. For example, memory 404 may include a primary memory 406 and a secondary memory 408. Primary memory 406 may include, for example, a random access memory, read only memory, etc. While illustrated in this example as being separate from a processing unit 410, it should be appreciated that all or part of primary memory 406 may be provided within or otherwise co-located/coupled with processing unit 410. Secondary memory 408 may include, for example, the same or similar type of memory as primary memory or one or more information storage devices or systems, such as, for example, a disk drive, an optical disc drive, a tape drive, a solid state memory drive, etc. In certain implementations, secondary memory 408 may be operatively receptive of, or otherwise enabled to be coupled to, a non-transitory computer-readable medium 412.

Computer-readable medium 412 may include, for example, any medium that can store or provide access to information, code or instructions (e.g., an article of manufacture, etc.) for one or more devices associated with computing environment 400. For example, computer-readable medium 412 may be provided or accessed by processing unit 410. As such, in certain example implementations, the methods or apparatuses may take the form, in whole or part, of a computer-readable medium that may include computer-implementable instructions stored thereon, which, if executed by at least one processing unit or other like circuitry, may enable processing unit 410 or the other like circuitry to perform all or portions of a location determination processes, sensor-based or sensor-supported measurements (e.g., acceleration, deceleration, orientation, tilt, rotation, etc.), extraction/computation of features from inertial sensor signals, classifying an activity co-located with a user of mobile device, or any like processes to facilitate or otherwise support rest detection of mobile device 402. In certain example implementations, processing unit 410 may be capable of performing or supporting other functions, such as communications, gaming, or the like.

Processing unit 410 may be implemented in hardware or a combination of hardware and software. Processing unit 410 may be representative of one or more circuits capable of performing at least a portion of information computing technique or process. By way of example but not limitation, processing unit 410 may include one or more processors, controllers, microprocessors, microcontrollers, application specific integrated circuits, digital signal processors, programmable logic devices, field programmable gate arrays, or the like, or any combination thereof.

Mobile device 402 may include various components or circuitry, such as, for example, one or more accelerometers 413, or various other sensor(s) 414, such as a magnetic compass, a gyroscope, a video sensor, a gravitometer, etc. to facilitate or otherwise support one or more processes associated with computing environment 400. For example, such sensors may provide analog or digital signals to processing unit 410. Although not shown, it should be noted that mobile device 402 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

Although not shown, mobile device 402 may also include a memory or information buffer to collect suitable or desired information, such as, for example, accelerometer measurement information (e.g., accelerometer traces), as previously mentioned. Mobile device may also include a power source, for example, to provide power to some or all of the components or circuitry of mobile device 402. A power source may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) mobile device 402.

Figure 5:
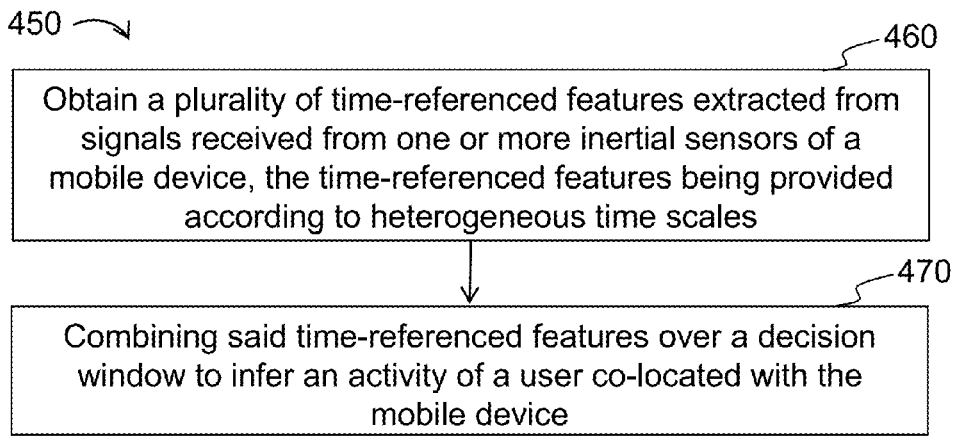
FIG. 5 is a flow chart illustrating a process of classifying user activity using temporal scaling of time-referenced features according to an implementation.

Mobile device 402 may include one or more connection bus 416 (e.g., buses, lines, conductors, optic fibers, etc.) to operatively couple various circuits together, and a user interface 418 (e.g., display, touch screen, keypad, buttons, knobs, microphone, speaker, trackball, data port, etc.) to receive user input, facilitate or support sensor-related signal measurements, or provide information to a user. Mobile device 402 may further include a communication interface 420 (e.g., wireless transmitter or receiver, modem, antenna, etc.) to allow for communication with one or more other devices or systems over one or more suitable communications networks, as was indicated FIG. 5 is a flow chart (450) illustrating a process of classifying user activity using temporal scaling of time-referenced features according to an implementation. Although the embodiment of FIG. 4 may be suitable for performing the method of FIG. 5, nothing prevents performing the method using alternative arrangements of structures and components. The method begins at block 460, which includes obtaining a plurality of time-referenced features extracted from signals received from one or more inertial sensors of a mobile device. In block 460, the time-referenced features are provided according to heterogeneous time scales. The method continues at 470, which includes combining the time-referenced features over a decision window to infer an activity of a user co-located with the mobile device.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (WCDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, acceleration, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. However, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
receiving signals from one or more inertial sensors of a mobile device;
determining, from the received signals, a first time-referenced feature in each of one or more first time windows according to a first time scale and a second time-referenced feature in each of one or more second time windows according to a second time scale, the first time scale different from the second time scale in lengths of the one or more first and second time windows, said first and second time-referenced features each indicating a likelihood of one or more activities using the respective first or second time scale;
combining said first and second time-referenced features over a decision window, wherein a number of the first time window(s) in the decision window is different from a number of the second time window(s) in the decision window; and
inferring an activity of a user co-located with said mobile device based on the combined first and second time-referenced features.

2. The method of claim 1, wherein combining said first and second time-referenced features over said decision window further comprises:
for each of said first and second time scales, computing activity likelihood function values based, at least in part, on features provided in said first and second time scales over said decision window, said activity likelihood function values being indicative of likelihood functions that said user is performing one of a plurality of activity classifications.

3. The method of claim 2, wherein, for each of said first and second time scales, said computed activity likelihood function values are combined over said first and second time scales; and
for one or more of said plurality of activity classifications, combining, over said first and second time scales, said activity likelihood function values combined over said decision window.

4. The method of claim 3, wherein combining, over said first and second time scales, said activity likelihood function values combined over said decision window further comprises weighting combinations of activity likelihood function values obtained over said decision window.

5. The method of claim 4, wherein combining activity likelihood function values for said first and second time scales over said decision window further comprises applying a weighting factor to a time window of at least one of said first and second time scales.

6. The method of claim 5, wherein said selecting said activity further comprises applying said combined time-referenced features to a Bayesian classifier to select an activity class from among a plurality of activity classes.

7. The method of claim 1, wherein said decision window is an integer multiple of at least one of said first and second time scales.

8. The method of claim 1, wherein at least one of said signals comprises an accelerometer trace.

9. The method of claim 1, wherein said signals comprise at least three accelerometer traces indicative of acceleration in at least three linear dimensions.

10. The method of claim 1, further comprising computing joint probabilities using a Gaussian Mixture Model.

11. The method of claim 1, further comprising:
computing Cepstral coefficients from said signals received from said one or more inertial sensors.

12. The method of claim 1, further comprising:
computing variance from accelerometer norm.

13. The method of claim 1, further comprising:
computing accelerometer orientation with respect to gravity.

14. An article comprising:
a non-transitory storage medium comprising machine-readable instructions stored thereon which are executable by a processor of a mobile device and configured to cause the processor to:
receive signals from one or more inertial sensors of a mobile device;
determine, from the signals, a first time-referenced feature in each of one or more first time windows according to a first time scale and a second time-referenced feature in each of one or more second time windows according to a second time scale, the first time scale different from the second time scale in lengths of the one or more first and second time windows, said first and second time-referenced features each indicating a likelihood of one or more activities using the respective first or second time scale;

combine said first and second time-referenced features over a decision window, wherein a number of the first time window(s) in the decision window is different from a number of the second time window(s) in the decision window; and infer an activity of a user co-located with said mobile device based on the combined first and second time-referenced features.

15. The article of claim 14, wherein said instructions are further configured to cause the processor to:

for each time scale, compute activity likelihood function values based, at least in part, on features provided in time scales over said decision window, said activity likelihood function values being indicative of likelihood functions that said user is performing one of a plurality of activity classes, and combining said computed activity likelihood function values over said time scale; and for one or more of said plurality of activity classes, combine, over multiple time scales, said computed activity likelihood function values combined over said decision window to combine said first and second time-referenced features over a decision window.

16. The article of claim 15, wherein said instructions are further configured to cause the processor to weight combinations of activity likelihood function values obtained over said decision window to combine, over said multiple time scales, said activity likelihood function values combined over said decision window.

17. The article of claim 14, wherein said non-transitory storage medium further comprises machine-readable instructions stored thereon which are executable by the processor of the mobile device and configured to cause the processor to:

infer said activity by selecting said inferred activity from among a plurality of activity classes.

18. The article of claim 17, wherein said instructions are further configured to cause the processor to apply said combined time-referenced features to Bayesian classifier to select an activity class from among said plurality of activity classes to select said activity.

19. The article of claim 14, wherein said time-referenced features are determined using Cepstral filtering.

20. The article of claim 14, wherein said non-transitory storage medium further comprises machine-readable instructions stored thereon which are executable by the processor of the mobile device and configured to cause the processor to:

compute joint probabilities of said activity likelihood function values using a Gaussian Mixture Model.

21. A mobile device comprising:
one or more inertial sensors; and
one or more processors configured to:
 receive signals from one or more inertial sensors of a mobile device;
 determine, from the signals, a first time-referenced feature in each of one or more first time windows according to a first time scale and a second time-referenced feature in each of one or more second time windows according to a second time scale, the first time scale different from the second time scale in lengths of the one or more first and second time windows, said first and second time-referenced features each indicating a likelihood of one or more activities using the respective first or second time scale;
 combine said first and second time-referenced features over a decision window, wherein a number of the first time window(s) in the decision window is different from a number of the second time window(s) in the decision window; and
 infer an activity of a user co-located with said mobile device based on the combined first and second time-referenced features.

22. The mobile device of claim 21, wherein said plurality of time-referenced features are Cepstral coefficients extracted from said received signals using one or more features compute modules.

23. The mobile device of claim 22, further comprising one or more likelihood function compute modules configured to compute a likelihood function for said activity across a time scale of said one or more features compute modules.

24. The mobile device of claim 23, wherein at least one of said one or more likelihood function compute modules is configured to apply weighting factors to said heterogeneous time scales.

25. The mobile device of claim 21, wherein said one or more inertial sensors comprises at least one accelerometer.

26. The mobile device of claim 21, wherein at least one of said one or more processors is further configured to implement a Bayesian classifier to infer said activity of said user co-located with said mobile device to combine said time-referenced features over a decision window.

27. The mobile device of claim 21, wherein at least one of said one or more processors is further configured to compute joint probabilities over said heterogeneous time scales using a Gaussian Mixture Model.

28. An apparatus comprising:
means for receiving signals from one or more inertial sensors of a mobile device;
means for determining, from the received signals, a first time-referenced feature in each of one or more first time windows according to a first time scale and a second time-referenced feature in each of one or more second time windows according to a second time scale, the first time scale different from the second time scale in lengths of the one or more first and second time windows, said first and second time-referenced features each indicating a likelihood of one or more activities using the respective first or second time scale; and
means for combining said first and second time-referenced features over a decision window, wherein a number of the first time window(s) in the decision window is different from a number of the second time window(s) in the decision window; and
means for inferring an activity of a user co-located with said mobile device based on the combined first and second time-referenced features.

29. The apparatus of claim 28, wherein said one or more inertial sensors comprises at least one accelerometer.

30. The apparatus of claim 29, wherein said means for determining, said first and second time-referenced features further comprises:
means for computing Cepstral coefficients from at least one output trace of said at least one accelerometer.

* * * * *